United States Patent [19]
Mikado

[11] 4,159,481
[45] Jun. 26, 1979

[54] SYNCHRONIZING SIGNAL SELECTING CIRCUIT

[75] Inventor: Tsuneo Mikado, Tokyo, Japan

[73] Assignee: Nippon Television Industry Corporation, Tokyo, Japan

[21] Appl. No.: 822,539

[22] Filed: Aug. 8, 1977

[30] Foreign Application Priority Data

Aug. 12, 1976 [JP] Japan ............................. 51-96269

[51] Int. Cl.² ............................................. H04N 9/46
[52] U.S. Cl. ...................................... 358/19; 358/163
[58] Field of Search ................. 358/19, 20, 153, 154

[56] References Cited
U.S. PATENT DOCUMENTS

3,671,669 6/1972 Abbott .............................. 358/154

Primary Examiner—Richard Murray
Attorney, Agent, or Firm—Woodcock, Washburn, Kurtz & Mackiewicz

[57] ABSTRACT

A synchronizing signal selecting circuit includes a counter for counting clock signals of a predetermined frequency in accordance with an input synchronizing signal; a reference signal forming circuit for forming a predetermined reference signal on the basis of the output of the counter; and a detecting circuit for detecting the input synchronizing signal on the basis of the output of the reference signal forming circuit.

17 Claims, 8 Drawing Figures

SYNCHRONIZING SIGNAL SELECTING CIRCUIT

BACKGROUND OF THE INVENTION

1. Field of the Invention

This invention relates to a synchronizing signal selecting circuit which works to select proper synchronizing signals from television video signals, and more particularly to a synchronizing signal selecting circuit which is most suitable for a synchronizing signal generator.

2. Description of the Prior Art

Figure 1:
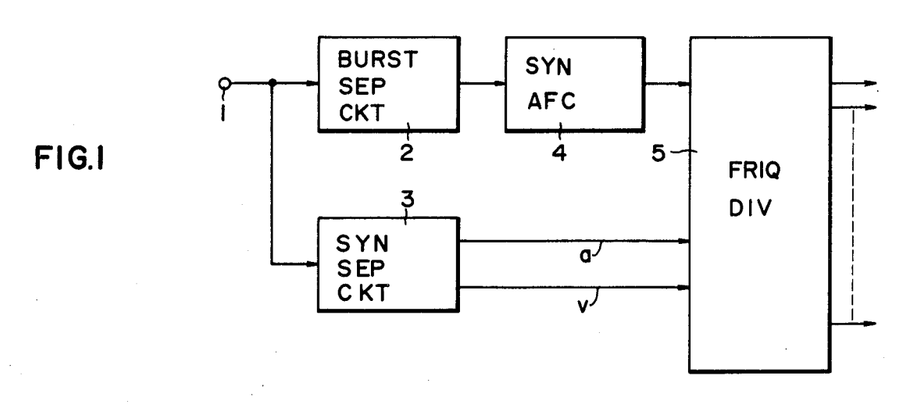
FIG. 1 is a block diagram of a known synchronizing signal generator.

FIG. 1 shows a well known synchronizing signal generator by which synchronizing signals are generated with reference to the synchronizing signals included in the television video signals. Transmitted video signals are supplied to an input terminal 1, and led to a burst separating circuit 2 and a synchronizing separtor circuit 3. A burst signal is separated in the burst separating circuit 2. A horizontal synchronizing signal a and a vertical synchronizing signal v are separated in the synchronizing separator circuit 3. The burst signal from the burst separating circuit 2 is averaged and controlled into a predetermined frequency (for example, 14.3 MHz) in a synchronizing AFC circuit 4. The output of the synchronizing AFC circuit 4 is supplied to a frequency divider 5 which includes a horizontal counter and a vertical counter. A horizontal synchronizing signal is obtained from the horizontal counter by which the output of the synchronizing AFC circuit 4 is divided, in the frequency divider 5. The frequency of the obtained horizontal synchronizing signal is divided by the vertical counter to generate a vertical synchronizing signal in the frequency divider 5.

In the operation of the frequency divider 5, the horizontal synchronizing signal a and the vertical synchronizing signal v are respectively supplied from the synchronizing separator circuit 3 to the frequency divider 5 to reset the horizontal counter and vertical counter of the frequency divider 5. With such reset operation, the new synchronizing signals obtained from the frequency divider 5 are synchronously combined with the synchronizing signals included in the video signals applied to the input terminal 1 (gen-lock).

In the well known synchronizing signal generator, noises included in the output of the synchronizing separator circuit 3 can similarly reset the horizontal counter and vertical counter of the frequency divider 5, to disturb the synchronous combination. Accordingly, it is required for the exact synchronous combination that only proper horizontal and vertical synchronizing signals are supplied to the frequency divider 5, even though they are not periodically supplied to the frequency divider 5.

SUMMARY OF THE INVENTION

An object of this invention is to provide a synchronizing signal selecting circuit which is superior in selectivity, although simple in construction.

Another object of this invention is to provide a synchronizing signal selecting circuit which can select only proper synchronizing signals from the video signals including spurious synchronizing signals such as noises by discriminating the pulse width and/or pulse period of an input synchronizing signal.

A further object of this invention is to provide a synchronizing signal selecting circuit which can select only proper synchronizing signals to supply the latter to a synchronizing signal generator for forming new synchronizing signals with reference to the synchronizing signals included in transmitted video signals.

A still further object of this invention is to provide a synchronizing signal selecting circuit which can supply only proper synchronizing signals as reset signals to a synchronizing signal generator, and thereby can synchronously combine the newly formed synchronizing signals with the synchronizing signals included in the video signals, without influence of noise.

In accordance with one aspect of this invention, a synchronizing signal selecting circuit includes a counter for counting clock signals of a predetermined frequency in accordance with an input synchronizing signal; a reference signal forming circuit for forming a predetermined reference signal on the basis of the output of the counter; and a detecting circuit for detecting the input synchronizing signal on the basis of the output of the reference signal forming circuit.

The above and other objects, features and advantages of this invention, will be apparent in the following detailed description of illustrative embodiments which are to be read in connection with the accompanying drawings.

DESCRIPTION OF THE PREFERRED EMBODIMENT

Figure 2A:
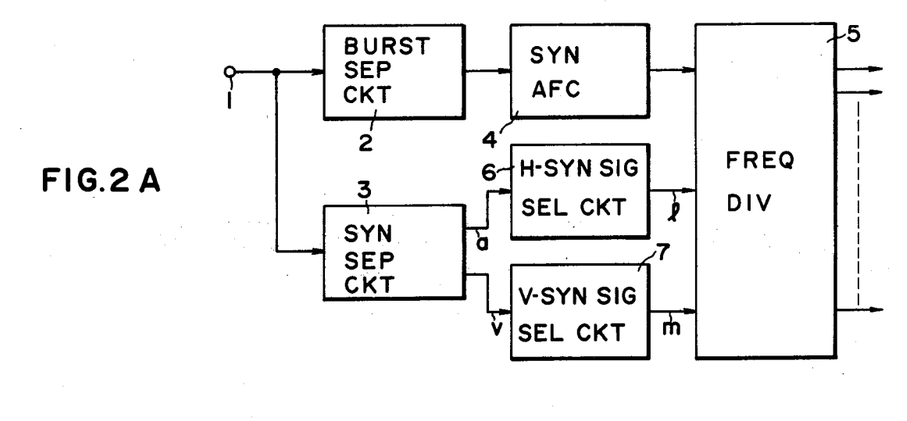
FIG. 2A is a block diagram of a synchronizing signal generator embodying the invention.

FIG. 2A shows a synchronizing signal generator in which a horizontal synchronizing signal selecting circuit 6 and a vertical synchronizing signal selecting circuit 7 are added to the known synchronizing signal generator of FIG. 1. The horizontal synchronizing signal a and vertical synchronizing signal v obtained from the synchronizing separator circuit 3 are respectively supplied to the horizontal synchronizing signal selecting circuit 6 and the vertical synchronizing signal selecting circuit 7. The horizontal and vertical synchronizing signal selecting circuits 6 and 7 work to select proper synchronizing signals from the signals including spurious synchronizing signal such as noise or the like. The output signals of the selecting circuits 6 and 7 are supplied to the frequency divider 5 as reset pulses l and m. Thus, the horizontal counter and the vertical counter of the frequency divider 5 are reset by the reset signals l and m. As a result, synchronizing signals regenerated at the frequency divider 5 are always synchronously combined only with the proper synchronizing signals included in the transmitted video signal.

Hereinafter, only the horizontal synchronizing signal selecting circuit 6 will be described in detail, since the vertical synchronizing signal selecting circuit 7 may have the similar circuit construction. The differences between operations of the selecting circuits 6 and 7 are only pulse width and period of the synchronizing signal to be selected.

Figure 2B:
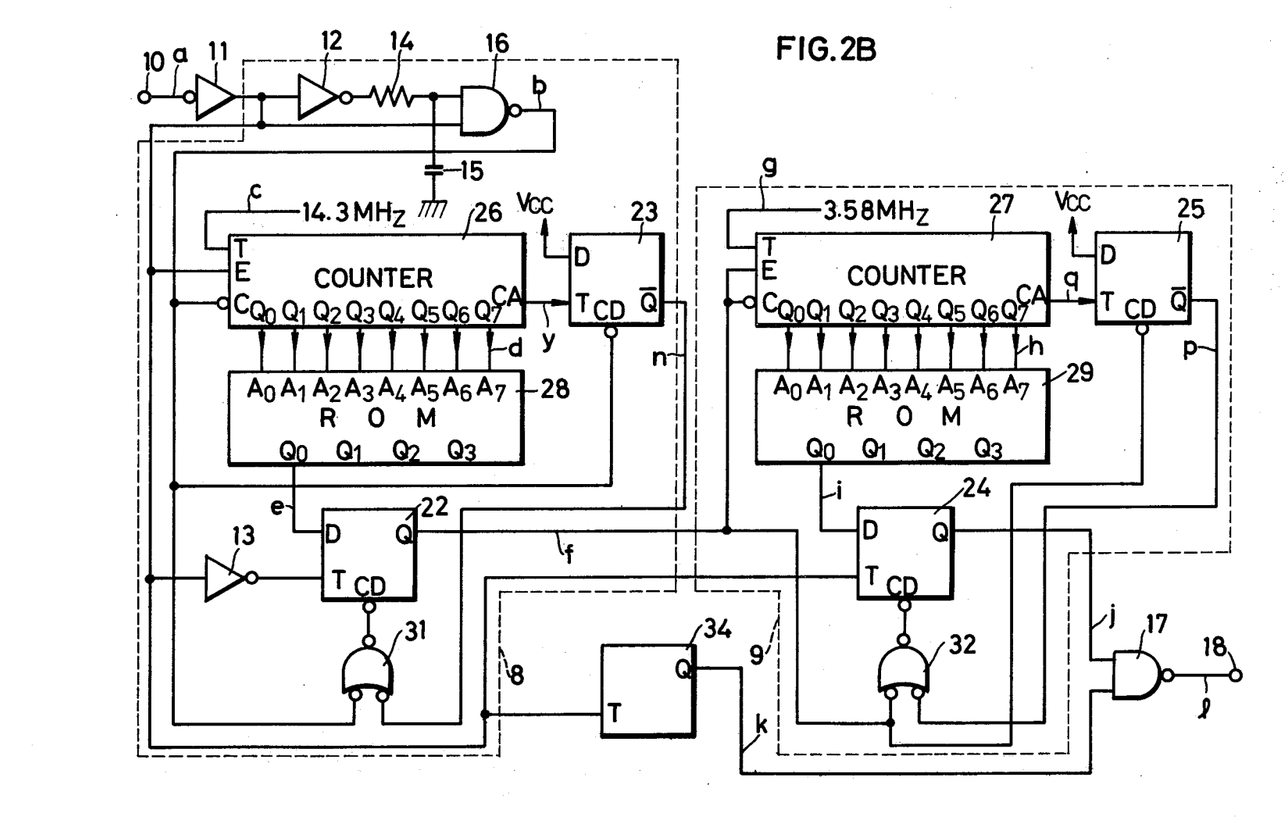
FIG. 2B is a circuit diagram of a horizontal synchronizing signal selecting circuit in the generator of FIG. 2A.

As shown in FIG. 2B, the horizontal synchronizing signal selecting circuit 6 includes a pulse width discriminating circuit 8 and a pulse period discriminating circuit 9. The circuit 8 discriminates the pulse width (4.5 μsec.) of the negative polarity pulse portion of the horizontal synchronizing signal shown in FIG. 5. The pulse period discriminating circuit 9 discriminates the pulse width (59 μsec.) of the positive polarity pulse portion of the horizontal synchronizing signal. The positive polarity pulse width of the horizontal synchronizing signal can be practically regarded as the period of the signal.

The circuit construction of the pulse width discriminating circuit 8 will be described. In FIG. 2B, the horizontal synchronizing signal a separated at the synchronizing separator circuit 3 of FIG. 2A, is supplied to an input terminal 10. The horizontal synchronizing signal a is inverted by an inverter 11, and then supplied to an enable terminal E of a counter 26, an inverter 12, a NAND circuit 16, an inverter 13, a terminal T of a monostable multivibrator 34 and a terminal T of a flip-flop 24.

The counter 26 may be of 256-counting type. It works to count clock pulses c of 14.3 MHz supplied to a terminal T of the counter 26, while a high level signal "H" is applied to the enable terminal E of the counter 26. The frequency (14.3 MHz) of the clock pulses c may be a multiple of the frequency (3.58 MHz) of the burst signal. For example, the clock pulses c are the output signal of the synchronizing AFC circuit 4 of FIG. 2A.

Output signal obtained from output terminals $Q_0$ to $Q_7$ of the counter 26 is supplied as an address signal to address input terminals $A_0$ to $A_7$ of a memory device 28.

The memory device 28 may be a ROM (random access memory). While the counter 26 is counting sixty four (64) clock pulses c corresponding to the negative pulse width (4.5 μsec) of the horizontal synchronizing signal a, + ten clock pulses c, namely fifty four (54) clock pulses c to seventy four (74) clock pulses c which correspond to 3.78 μsec to 5.18 μsec, a high level signal "H" is obtained from an output terminal $Q_0$ of the memory device 28. And while the counter 26 is counting the clock pulses c in any other number than fifty four (54) clock pulses c to seventy four (74) clock pulses c, a low level signal "L" is obtained from the output terminal $Q_0$ of the memory device 28. Thus, an output signal e as shown in FIG. 3 is obtained from the output terminal $Q_0$ of the memory device 28, and it is supplied to a terminal D of the flip-flop 22.

The flip-flop 22 is of a D-type flip-flop. The output of the inverter 11 is supplied through the inverter 13 to the terminal T of the flip-flop 22. An output of an OR-circuit 31 is supplied as a clear signal to a clear terminal CD of the flip-flop 22. An output signal b of a NAND-circuit 16 and an output signal n obtained from a terminal $\overline{Q}$ of a flip-flop 23 are applied to input terminals of the OR-circuit 31, respectively. An output signal f obtained from an output terminal $\overline{Q}$ of the flip-flop 22 is put into low level "L" with the application of the clear signal to the terminal CD of the flip-flop 22.

Similarly, the flip-flop 23 is of a D-type flip-flop. When the counter 26 has counted two hundreds and fifty six (256) clock pulses c, a carry-out signal y is obtained from an output terminal CA of the counter 26, and it is applied to a terminal T of the flip-flop 23. A terminal D of the flip-flop 23 is connected to a positive power supply. When the flip-flop 23 is triggered with the carry out signal y from the counter 26, the output signal n obtained from the terminal $\overline{Q}$ of the flip-flop 23 is put into low level "L", and it is supplied as the clear signal through the OR-circuit 31 to the terminal CD of the flip-flop 22.

The function of the flip-flop 23 is as follows: When the counter 26 has counted two hundreds and fifty six (256) clock pulses c, it is reset to zero, and then again continues to count the clock puls c. Accordingly, when the counter 26 has counted (256+54) clock pulses c, the same signal e as when the counter 26 has counted fifty four (54) clock pulses c is obtained from the output terminal $Q_0$ of the memory device 28. Generally, the same signal e is obtained, whenever the counter 26 has counted (54+256×n which is integral number) clock pulses c. Accordingly, the flip-flop 22 is cleared whenever the counter 26 has counted 256 clock pulses c, so that the information of the previous signal e is not led out as the output signal f from the flip-flop 22. The flip-flop 23 works to supply the clear signal n to the flip-flop 22.

Figure 3A:
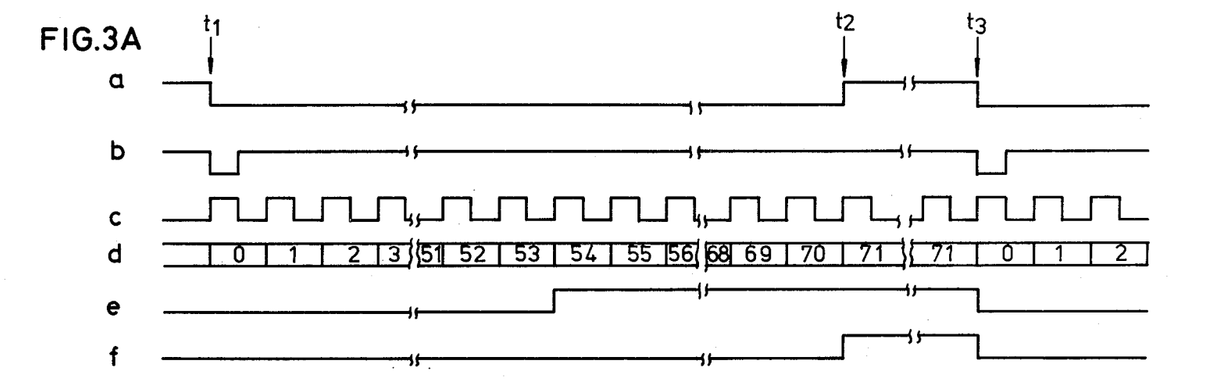
FIGS. 3A, 3B, 3C and 4 are waveform diagrams for explaining the operation of the horizontal synchronizing signal selecting circuit of FIG. 2B.
Figure 3B:
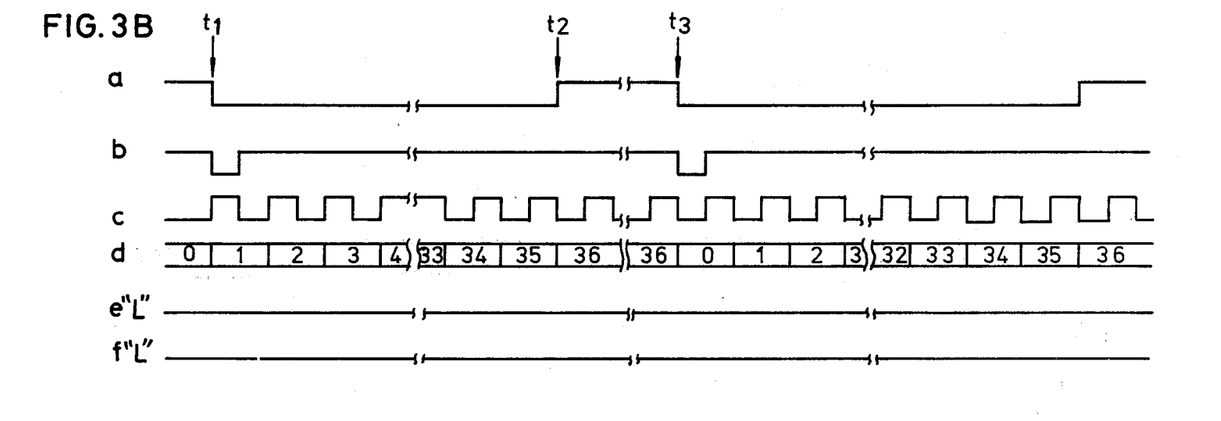
Figure 3C:
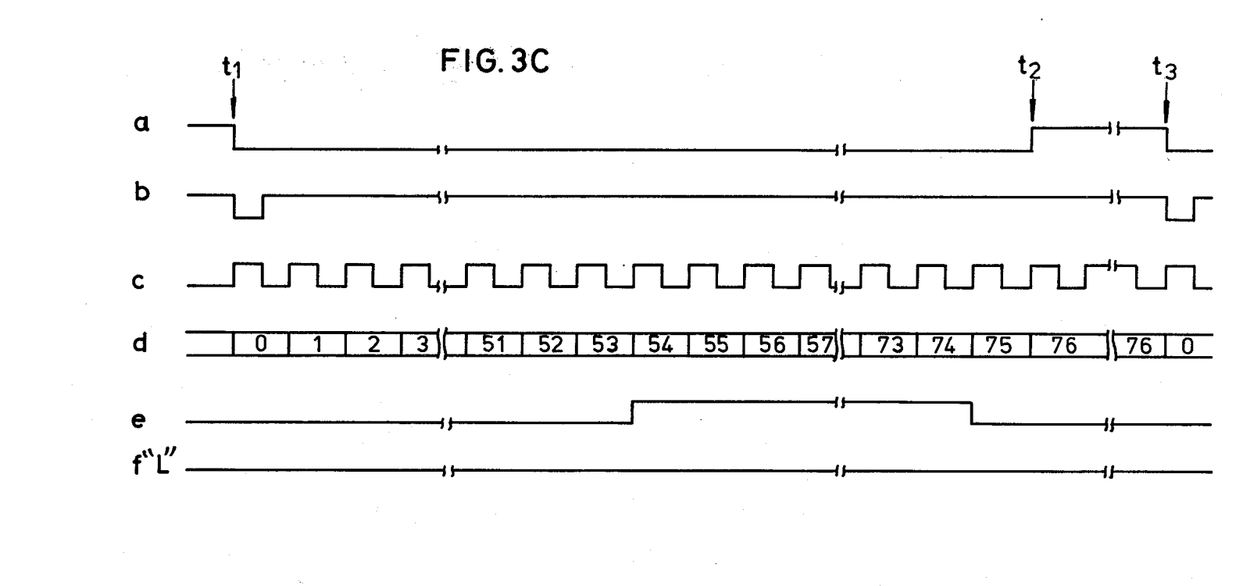

An inverter 12 to which the output of the inverter 11 is applied, works to form the signal b as shown in FIG. 3A to FIG. 3C, in cooperation with an integrator consisting of a resistor 14 and a capacitor 15, and the NAND circuit 16. The signal b is supplied to a clear terminal C of the counter 26 to clear the latter, and further supplied to the clear terminal CD of the flip-flop 23 to clear the latter. Moreover, the signal b is supplied through the OR-circuit 31 to the clear terminal CD of the flip-flop 22 to clear the latter. With the clear signal, the signal f obtained from the output terminal Q of the flip-flop 22 is put into low level "L", and the signal n obtained from the output terminal $\overline{Q}$ of the flip-flop 23 is put into high level "H".

Next, construction of the pulse period descriminating circuit 9 will be described in detail.

The signal f from the pulse width discriminating circuit 8 is supplied to terminals E and C of another counter 27, a terminal CD of a flip-flop 25, and through an OR-circuit 32 to a terminal CD of a flip-flop 24.

The counter 27 may be of a 256-counting type. While a high level signal "H" is applied to the enable terminal E of the counter 27, the counter 27 works to count clock pulses g (FIG. 4) of 3.58 MHz supplied to a terminal T of the counter 27. The clock pulses g may be formed by dividing the output (14.3 MHz) of the synchronizing AFC circuit 4. An output signal h (FIG. 4) obtained from output terminals $Q_0$ to $Q_7$ of the counter 27 is supplied as an address signal to address input terminals $A_0$ to $A_7$ of another memory device 29.

Figure 4:
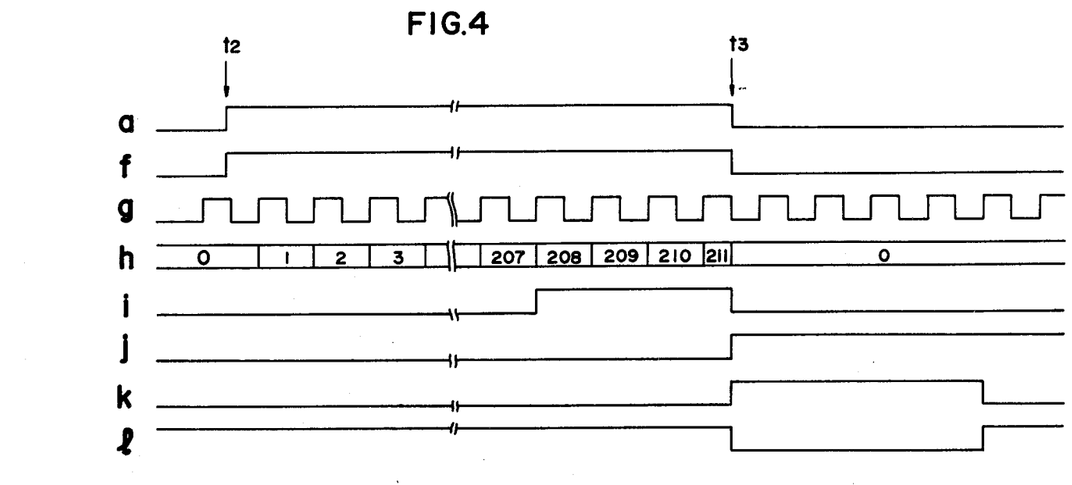

The memory device 29 may be a ROM. While the counter 27 is counting two hundreds and eleven (211) clock pulses g corresponding to the positive pulse width (59 μsec) of the horizontal synchronizing signal a, ± three clock pulse g, namely 208 clock pulses g to 214 clock pulses q which correspond to 58.0 μsec to 59.7 μsec, a high level signal "H" is obtained from an output terminal $Q_0$ of the memory device 29. And while the counter 27 is counting the clock pulses g in any other number than 208 clock pulses g to 214 clock pulses g, a low level signal "L" is obtained from the output terminal $Q_0$ of the memory device 29. Thus, an output signal i as shown in FIG. 4 is obtained from the output terminal $Q_0$ of the memory device 29, and it is supplied to a terminal D of the flip-flop 24.

The flip-flop 24 is of a D-type flip-flop. The output of the inverter 11 is supplied to the terminal T of the flip-flop 24. An output of an OR-circuit 32 is spplied as a clear signal to a clear terminal CD of the flip-flop 24. The output signal f of the flip-flop 22 and an output signal p obtained from a terminal Q of a flip-flop 25 are applied to input terminals of the OR-circuit 32, respectively. An output signal j obtained from an output terminal $\overline{Q}$ of the flip-flop 24 is put into low level "L" with the application of the clear signal to the terminal CD of the flip-flop 24.

Similarly, the flip-flop 25 is of a D-type flip-flop. When the counter 27 has counted two hundreds and fifty six (256) clock pulses g, a carry-out signal q is obtained from an output terminal CA of the counter 27, and it is applied to a terminal T of the flip-flop 25. A terminal D of the flip-flop 25 is connected to a positive power supply. When the flip-flop 25 is triggered with the carry-out signal q from the counter 27, the output signal p obtained from the terminal $\overline{Q}$ of the flip-flop 25 is put into low level "L", and it is supplied as the clear signal through the OR-circuit 32 to the terminal CD of the flip-flop 24.

The function of the flip-flop 25 is as follows: When the counter 27 has counted two hundreds and fifty six (256) clock pulses g, it is reset to zero, and then again continues to count the clock puls g. Accordingly, when the counter 27 has counted (256+208) clock pulses g, the same signal i as when the counter 27 has counted 208 clock pulses g is obtained from the output terminal $Q_0$ of the memory device 29. Generally, the same signal i is obtained, whenever the counter 27 has counted (208+256×n which is integral number) clock pulses g. Accordingly, the flip-flop 24 is cleared whenever the counter 27 has counted 256 clock pulses g, so that the information of the previous signal i is not led out as the output signal j from the flip-flop 24. The flip-flop 25 works to supply the clear signal p to the flip-flop 24.

The signal j obtained from the terminal Q of the flip-flop 24 is supplied to one terminal of a NAND-circuit 17. A signal k obtained from a terminal Q of the monostable multivibrator 34 is supplied to another terminal of the NAND circuit 17. The monostable multivibrator 34 is triggered with the output of the inverter 11. It generates a pulse of the width of 1.5 μsec as the result of its inversion operation. An output signal l of the NAND circuit 17 is led out from an output terminal 18, and it is supplied as the reset signal to the frequency divider 5.

Next, operation of the synchronizing signal generator of FIG. 2A and FIG. 2B will be described. Since operation of the horizontal synchronizing signal selecting circuit 6 is substantially similar to that of the vertical synchronizing signal selecting circuit 7, only the operation of the horizontal synchronizing signal selecting circuit 6 will be next described.

First, with the reference to FIG. 3A, there will be described the operation of the pulse width discriminating circuit 8 in the case that the normal horizontal synchronizing signal a is supplied to the input terminal 10 shown in FIG. 2B from the one output terminal of the synchronizing separator circuit 3 shown in FIG. 2A.

Figure 5:
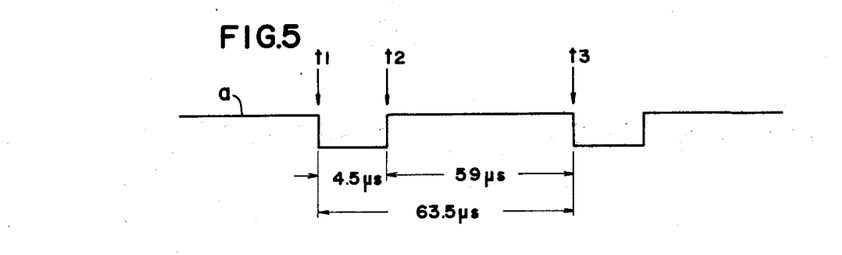
FIG. 5 is a waveform diagram of the horizontal synchronizing signal to be supplied to the horizontal synchronizing signal selecting circuit.

The normal horizontal synchronizing signal a is a negative synchronizing pulse, as shown in FIG. 5, whose pulse width is 4.5 μsec, and whose period is 63.5 μsec.

The counter 26 is cleared at time $t_1$ with the application of the signal b to the terminal C. A high level signal "H" is supplied to the enable terminal E of the counter 26 for the time ranging from time $t_1$ to $t_2$. Accordingly, the counter 26 starts to count the clock pulses c supplied to the terminal T of the counter 26 from time $t_1$. For convenience, the output signal d of the counter 26 is represented in the manner shown in FIG. 3A.

The signal a is put into high level "H" from low level "L" at time $t_2$. Accordingly, a low level signal "L" is supplied to the terminal E of the counter 26. The counter 26 stops counting the clock pulses c at time $t_2$. The output signal d of the counter 26 at the time $t_2$ is maintained until time $t_3$ at which the counter 26 is cleared.

The signal e obtained from the terminal $Q_0$ of the memory device 28 to which the signal d as the address input is applied, is put in high level "H" for the time when the counter 26 is counting fifty four (54) to seventy four (74) clock pulses c. Accordingly, in this embodiment, the signal e, as shown in FIG. 3A, is maintained at high level "H" for the time ranging from the time at which the counter 26 has counted fifty four (54) clock pulses c, to the time $t_3$ until which the result that the counter 26 has counted seventy one (71) clock pulses c is maintained.

While the signal e is put in high level "H", the flip-flop 22 is triggered with the leading edge of the signal a at time $t_2$. The signal f is obtained from the terminal Q of the flip-flop 22. The high level "H" of the signal f is maintained from time $t_2$ until the time $t_3$ at which the flip-flop 22 is cleared.

Next, with reference to FIG. 3B, there will be described the case that the signal a having a shorter pulse width than the pulse width of the normal synchronizing signal a, such as noise, is supplied to the input terminal 10. The pulse width means the time ranging from time $t_1$ to time $t_2$ for which the signal a is maintained at high level "H".

The signal a of FIG. 3B is put into high level "H" from low level "L" at the time $t_2$ at which the counter 26 has counted thirty six (36) clock pulses c. A low level signal "L" is supplied to the terminal E of the counter 26. Accordingly, the counter 26 stops counting the clock pulses c at the time $t_2$. The output signal d of the counter 26 at the time $t_2$ is maintained until the time $t_3$ at which the counter 26 is cleared.

As above-described, the signal e obtained from the terminal $Q_0$ of the memory device 28 to which the output signal d of the counter 26 is supplied as the address input, can be put in high level "H" only for the time when the counter 26 is counting 54 to 74 clock pulses c. Accordingly, in the case of FIG. 3B, the signal e is maintained at low level "L". Accordingly, although the flip-flop 22 is triggered with the leading edge of the signal a at time $t_2$, the signal f obtained from the terminal Q of the flip-flop 22 remains low level "L". The signal f is maintained at low level "L" until the synchronizing signal a becomes normal as shown in FIG. 3A.

Next, with reference to FIG. 3C, there will be described the case that the signal a having a longer pulse width than the pulse width of the normal synchronizing signal a, is supplied to input terminal 10. The pulse width means the time ranging from time $t_1$ to time $t_2$ for which the signal a is maintained at high level "H".

The signal a of FIG. 3C is put into high level "H" from low level "L" at the time $t_2$ at which the counter 26 has counted seventy six (76) clock pulses c. A low level signal "L" is supplied to the terminal E of the counter 26. Accordingly, the counter 26 stops counting the clock pulses c at the time $t_2$. The output signal d of the counter 26 at the time $t_2$ is maintained until the time $t_3$ at which the counter 26 is cleared.

As above-described, the signal e obtained from the terminal $Q_0$ of the memory device 28 to which the output signal d of the counter 26 is supplied as the address input, can be put in high level "H" only for the time when the counter 26 is counting 54 to 74 clock pulses c. Accordingly, as shown in FIG. 3C, the signal e is put into low level "L" at the time when the counter 26 has counted 74 clock pulses c. Accordingly, although the flip-flop 22 is triggered with the leading edge of the signal a at time $t_2$, the signal f obtained from the terminal Q of the flip-flop 22 remains low level "L". The signal f is maintained at low level "L" until the synchronizing signal a becomes normal as shown in FIG. 3A.

As above described, the signal f can be put into high level "H", only when the negative pulse width of the signal a applied to the input terminal 10 is in the predetermined range of 3.78 μsec to 5.18 μsec which corresponds to the range of 54 to 74 clock pulses c.

Next, operation of the pulse period discriminating circuit 9 to which the above described signal f is supplied, will be described with reference to FIG. 2B and FIG. 4.

When the horizontal synchronizing signal a supplied to the input terminal 10 is normal as shown in FIG. 3A, the signal f is put into high level "H" from low level "L" at time $t_2$. The counter 27 starts to count from zero the clock pulses g supplied to the terminal T of the counter 27 at the time $t_2$. The signal f is put into low level "L" from high level "H" at the time $t_3$ when the flip-flop 22 is cleared. Accordingly, the counter 27 stops counting the clock pulses g at the time $t_3$, and at the same time, it is cleared.

The signal e obtained from the terminal $Q_0$ of the memory device 29 to which the signal h as the address input is applied, is put in high level "H" for the time when the counter 27 is counting 208 to 214 clock pulses g. Accordingly, in this embodiment, the signal i, as shown in FIG. 4, is maintained at high level "H" for the time ranging from the time at which the counter 27 has counted 208 clock pulses g, to the time $t_3$ at which the counter 27 is cleared.

While the signal i is put in high level "H", the flip-flop 24 is triggered with the trailing edge of the signal a at time $t_3$. The signal j is obtained from the terminal Q of the flip-flop 24. The high level "H" of the signal j is maintained from time $t_3$ until the flip-flop 24 is cleared.

The signal j can be put into high level "H", only when the positive pulse width of the horizontal synchronizing signal a applied to the input terminal 10 is in the predetermined range of 58.0 μsec to 59.7 μsec which corresponds to the range of 208 to 214 clock pulses g to be counted by the counter 27.

Only the horizontal synchronizing signal a having the normal negative pulse width is supplied to the pulse period discriminating circuit 9 from the pulse width descriminating circuit 8. Accordingly, that the pulse period discriminating circuit 9 detects whether the positive pulse width of the horizontal synchronizing signal a is in the predetermined range, or not, is substantially equal to that the pulse period discriminating circuit 9 detects whether the period or phase of the horizontal synchronizing signal a is in the predetermined range, or not.

When the time at which the counter 27 is cleared with the trailing edge of the signal f, does not coincide with or before, the time at which the flip-flop 24 is triggered with the trailing edge of the signal a, the counter 27 may be cleared with the signal b obtained from the inverter 11, or the trailing edge of the signal f may be delayed with another monostable multivibrator.

The signal j and the signal k obtained from the terminal Q of the monostable multivibrator 34 are supplied to the NAND circuit 17. The monostable multivibrator 34 is triggered at the time $t_3$, and has the inversion time of 1.5 μsec as above described. As the result, the signal l having the pulse width of 1.5 μsec is obtained from the NAND circuit 17, as shown in FIG. 4.

The description of construction and operation of the vertical synchronizing signal selecting circuit 7 has been omitted. The construction and operation of the vertical synchronizing signal selecting circuit 7 may be similar to those of the horizontal synchronizing signal selecting circuit 6.

The vertical synchronizing signal v is a positive synchronizing signal. The width of the positive going pulse portion of the vertical synchronizing signal v is 190 μsec. And the width of the negative going pulse portion of the vertical synchronizing signal v is 16.5 msec. The period of the vertical synchronizing signal v is 16.7 msec (60 Hz).

In the operation of the vertical synchronizing signal selecting circuit 7, referring to FIG. 2B, the vertical synchronizing signal v is supplied to the input terminal 10. Clock signals having lower frequencies than the frequencies of the clock signals c and g are supplied to the counters 26 and 27, respectively. The ROMs 28 and 29 are so designed as to form output signals e and i in accordance with the ranges of permissible variations of the widths of the positive going and negative going pulse portions of the vertical synchronizing signal, respectively. In the same manner as the operation of the horizontal synchronizing signal selecting circuit 6, after the width of the positive going pulse portion of the vertical synchronizing signal is discriminated, the width of the negative going pulse portion of the vertical synchronizing signal is discriminated. Thus, the pulse width and pulse period of the vertical synchronizing signal v are discriminated.

While there has been described one embodiment of this invention, it will be understood that various modifications are possible without departing from the spirit and scope of the invention.

For example, the range of the selection of the horizontal synchronizing signal selecting circuit 6 is determined in such a manner that the one memory device 28 generates the output signal e only for the time when the counter 26 is counting 54 to 74 clock pulses of 14.3 MHz which corresponds to 3.78 μsec to 5.18 μsec, and the other memory device 29 generates the output signal i only for the time when the counter 27 is counting 208 to 214 clock pulses of 3.58 MHz which corresponds to 58.0 μsec to 59.7 μsec. However, the frequencies of the clock pulses applied to the counters 26 and 27, or the memory contents of the memory devices 28 and 29 may be varied in accordance with the range of the selection of the horizontal synchronizing signal selecting circuit 6.

Although the above embodiment is applied to the selection of the horizontal synchronizing signal and vertical synchronizing signal, this invention may be applied to any other synchronizing signal such as an equalizing pulse.

In the above embodiment, the pulse width of the synchronizing signal is discriminated by the pulse width discriminating circuit 8 including the counter 26 and the memory device 28, and then the pulse period of the synchronizing signal is discriminated by the pulse period discriminating circuit 9 including the counter 27 and the memory device 29. Thus, the synchronizing signal having the normal pulse width and pulse period is selected. However as occasion demands, one of the pulse width discriminating circuit 8 and the pulse period discriminating circuit 9 may be separately used.

The memory devices 28 and 29 of FIG. 2B may comprise decoders consisting of combinations of gates circuits such as AND-circuits and OR-circuits. In that case, binary counting output is supplied to the decoder from the output terminals $Q_0$ to $Q_7$ of the counter 26. The decoder is so designed as to generate a signal e put into high level "H" only for the time when the counter 26 is counting 54 to 74 clock pulses. Alternatively, the memory devices 28 and 29 may comprise flip-flops. In that case, for example, the flip-flop is set with the application of the binary counting output of the counter 26 which has counted 54 clock pulses, and it is reset with the application of the binary counting output of the counter 26 which has counted 74 clock pulses or with the application of the clear signal. Thus, substantially the same signal can be obtained, as the signal e shown in FIG. 3A to FIG. 3C.

What is claimed is:

1. A synchronizing signal selecting circuit comprising:
    (A) means for generating clock signals of a frequency larger than the frequency of said synchronizing signal;
    (B) a counter coupled to said means for generating clock signals for counting said clock signals during a synchronizing signal such that the count represents the duration of the synchronizing signal;
    (C), a reference signal generating circuit coupled to the output of said counter for generating a reference signal corresponding to the range of permissible variation in said duration in response to the count of said counter; and
    (D), a detecting circuit coupled to the output of said signal generating circuit for detecting said input synchronizing signal in response to the output of said reference signal generating circuit.

2. A synchronizing signal selecting circuit according to claim 1, in which said duration of said synchronizing signals corresponds to a pulse width and/or pulse period of said synchronizing signal.

3. A synchronizing signal selecting circuit according to claim 1, in which said synchronizing signal is included in a transmitted video signal.

4. A synchronizing signal selecting circuit according to claim 3, in which said synchronizing signal corresponds to a horizontal and/or a vertical synchronizing signal.

5. A synchronizing signal selecting circuit according to claim 1, in which the frequency of said clock signals is a multiple of the frequency of a color burst signal included in a transmitted video signal.

6. A synchronizing signal selecting circuit according to claim 1, in which said reference signal generating circuit is a fixed memory circuit to which the output of said counter is supplied as an address signal and from which said reference signal is obtained in accordance with the count of said counter.

7. A synchronizing signal selecting circuit according to claim 1, in which said reference signal generating circuit is a decoder circuit to decode the output of said counter into said reference signal in accordance with the count of said counter.

8. A synchronizing signal selecting circuit according to claim 1, in which said reference signal generating circuit comprises a flip-flop having a set terminal and a reset terminal, a counting output of said counter corresponding to the lowest limit of said range being coupled to said set terminal and a counting output corresponding to the highest limit of said range being supplied to said reset terminal.

9. A synchronizing signal selecting circuit according to claim 1, in which said detecting circuit comprises a flip-flop to which said reference signal is supplied and which is triggered with said synchronizing signal.

10. A synchronizing signal selecting circuit according to claim 9, in which said flip-flop is cleared at every period of said synchronizing signal, or on the basis of a carry-out signal from said counter.

11. A synchronizing signal selecting circuit comprising:
    (A), means for generating clock signals of a frequency larger than the pulse width and the pulse period of the synchronizing signal;
    (B), a first counter coupled to said means for generating clock signals for counting first clock signals corresponding to the pulse width of a synchronizing signal;
    (C), a first reference signal generating circuit coupled to the output of said first counter for generating a reference signal corresponding to the range of permissible variations of the pulse width of said synchronizing signal in response to the output of said first counter;
    (D), a first detecting circuit coupled to said first reference signal generating circuit for detecting said synchronizing signal as a proper synchronizing signal in response to the output of said reference signal generating circuit;
    (E), a second counter coupled to said means for generating clock signals and said first detecting circuit for counting clock signals corresponding to the pulse period;
    (F), a second reference signal generating circuit coupled to the output of said second counter for generating a reference signal corresponding to the range of permissible variations of the pulse period of said synchronizing signal; and
    (G), a second detecting circuit coupled to said second reference signal generating circuit for detecting said synchronizing signal as a proper synchronizing signal in response to the output of said second reference signal forming circuit.

12. A synchronizing signal selecting circuit according to claim 11, in which said input synchronizing signal is included in a transmitted video signal.

13. A synchronizing signal selecting circuit according to claim 12, in which said synchronizing signal corresponds to a horizontal and/or a vertical synchronizing signal.

14. A synchronizing signal generator for forming a new synchronizing signal with reference to the synchronizing signal included in transmitted video signals, comprising:
    (A), a frequency divider for dividing clock signals of a predetermined frequency to form said new synchronizing signal; and
    (B), a synchronizing signal selecting circuit for selecting proper synchronizing signals from the synchronizing signals separated from said video signals by discriminating the pulse widths and/or pulse periods of said synchronizing signals, whereby said frequency divider is reset with the output signal of said synchronizing signal selecting circuit to combine synchronously the synchronizing signal included in said video signals with the new synchronizing signal.

15. A synchronizing signal generator according to claim 14, in which said synchronizing signal selecting circuit comprises a horizontal synchronizing signal selecting circuit for selecting proper horizontal synchronizing signals from the horizontal synchronizing signals included in said video signals, and a vertical cynchronizing signal selecting circuit for selecting proper vertical synchronizing signals from the vertical synchronizing signals included in said video signals.

16. A synchronizing signal generator according to claim 15, in which said frequency divider includes a first counter for forming a new horizontal synchronizing signal by dividing said clock signals, and a second counter for forming a new vertical synchronizing signal by dividing the frequency of said new horizontal synchronizing signal, said first counter being reset with the output signal of said horizontal synchronizing signal selecting circuit, and said second counter being reset with the output signal of said vertical synchronizing signal selecting circuit.

17. A synchronizing signal generator according to claim 14, in which said synchronizing signal selecting circuit comprises:
(A), means for generating clock signals of a frequency larger than the frequency of said synchronizing signal;
(B), a counter coupled to said means for generating signals for counting said clock signals during a synchronizing signal such that the count represents the pulse width and/or pulse period of a synchronizing signal;
(C), a reference signal generating circuit coupled to said counter for generating a reference signal corresponding to the range of permissible variations of said one of the pulse width and/or pulse period of said synchronizing signal in response to the output of said counter; and
(D), a detecting circuit coupled to said reference signal generating circuit for detecting said input synchronizing signal as a proper synchronizing signal in response to the output of said reference signal generating circuit.

* * * * *